Feb. 28, 1967     R. KRAMER     3,307,026
ARTIFICIAL ILLUMINATING DEVICE
Filed March 3, 1964     3 Sheets-Sheet 1
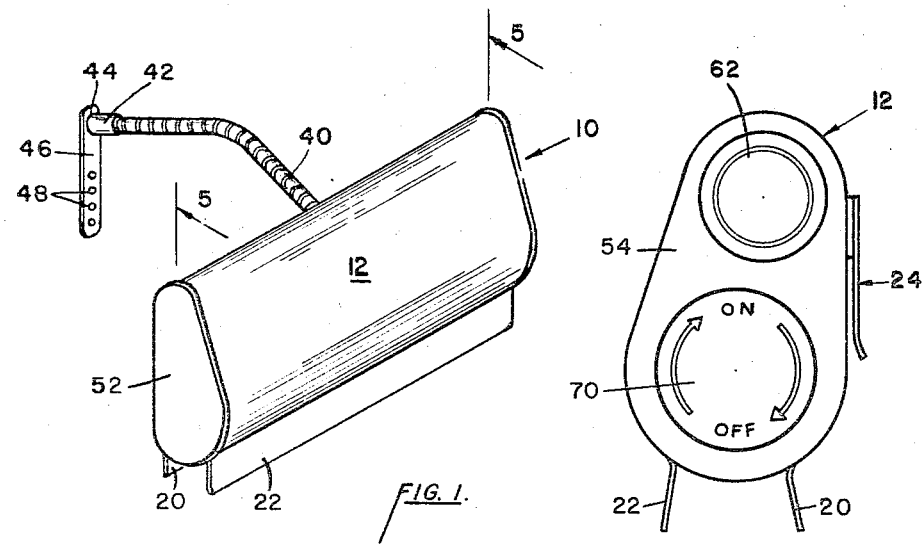
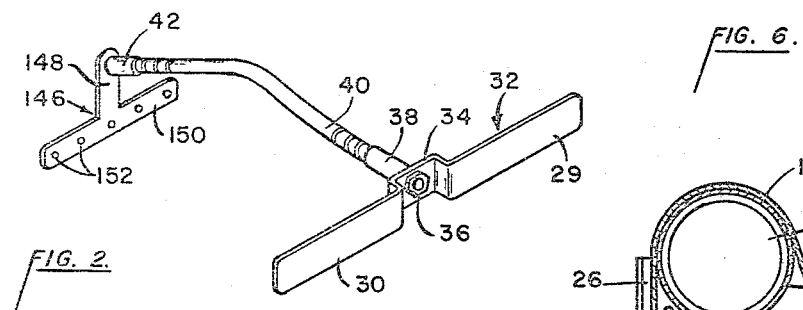
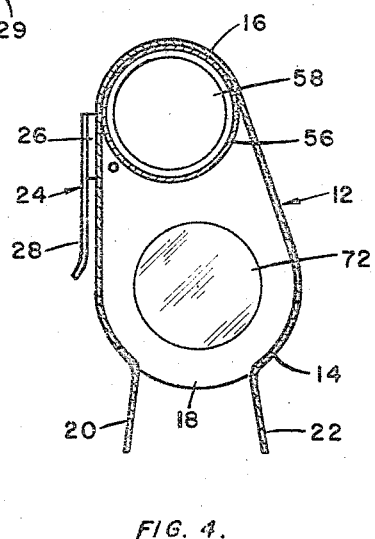
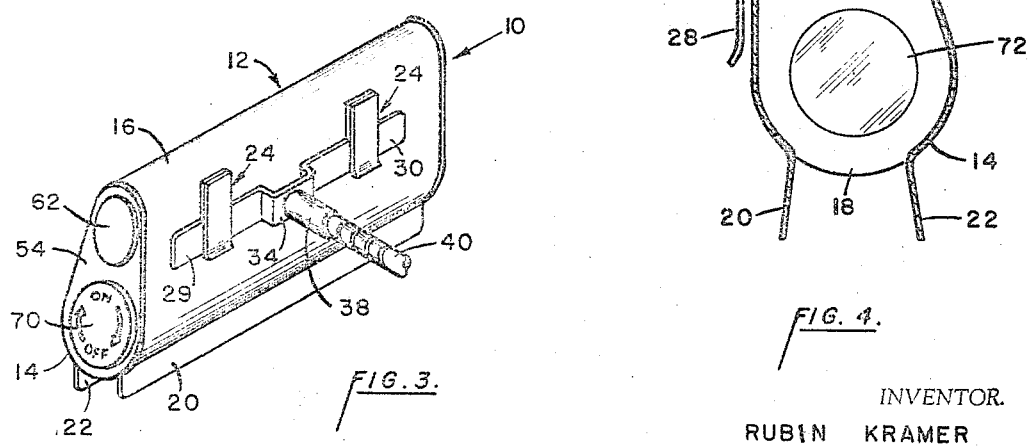
INVENTOR.
RUBIN KRAMER
BY JAMES E. SIEGEL
ATTORNEY

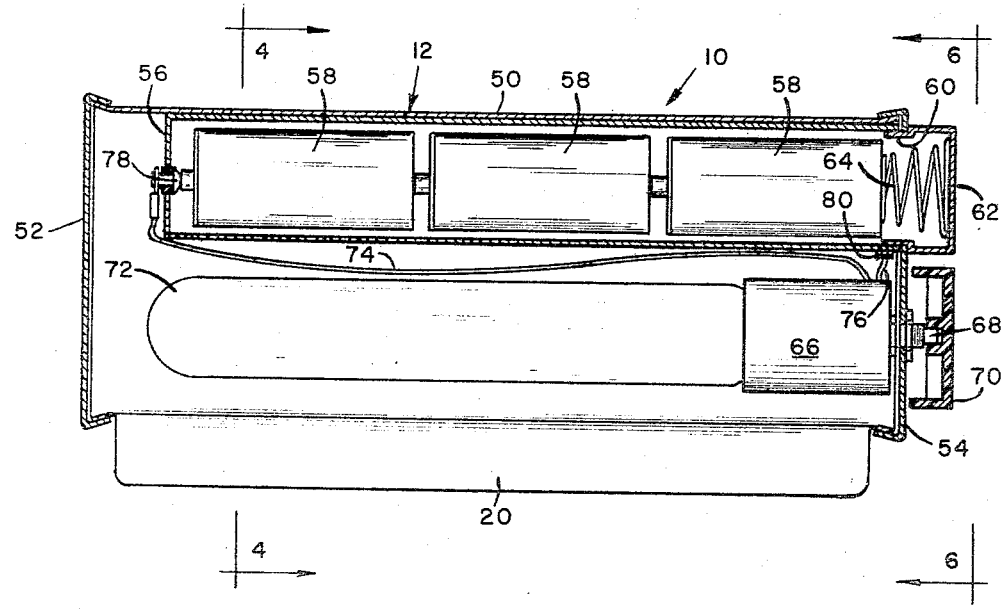
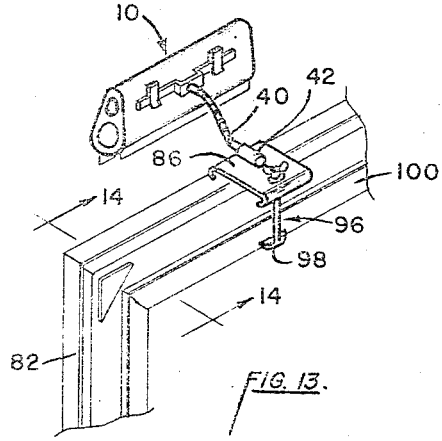
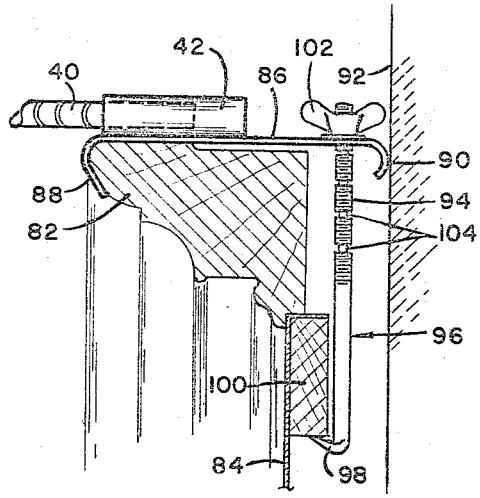
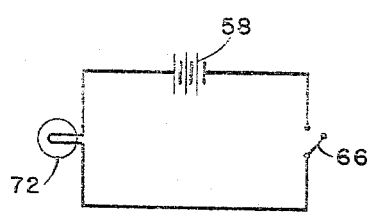
INVENTOR.
RUBIN KRAMER
BY
JAMES E. SIEGEL
ATTORNEY

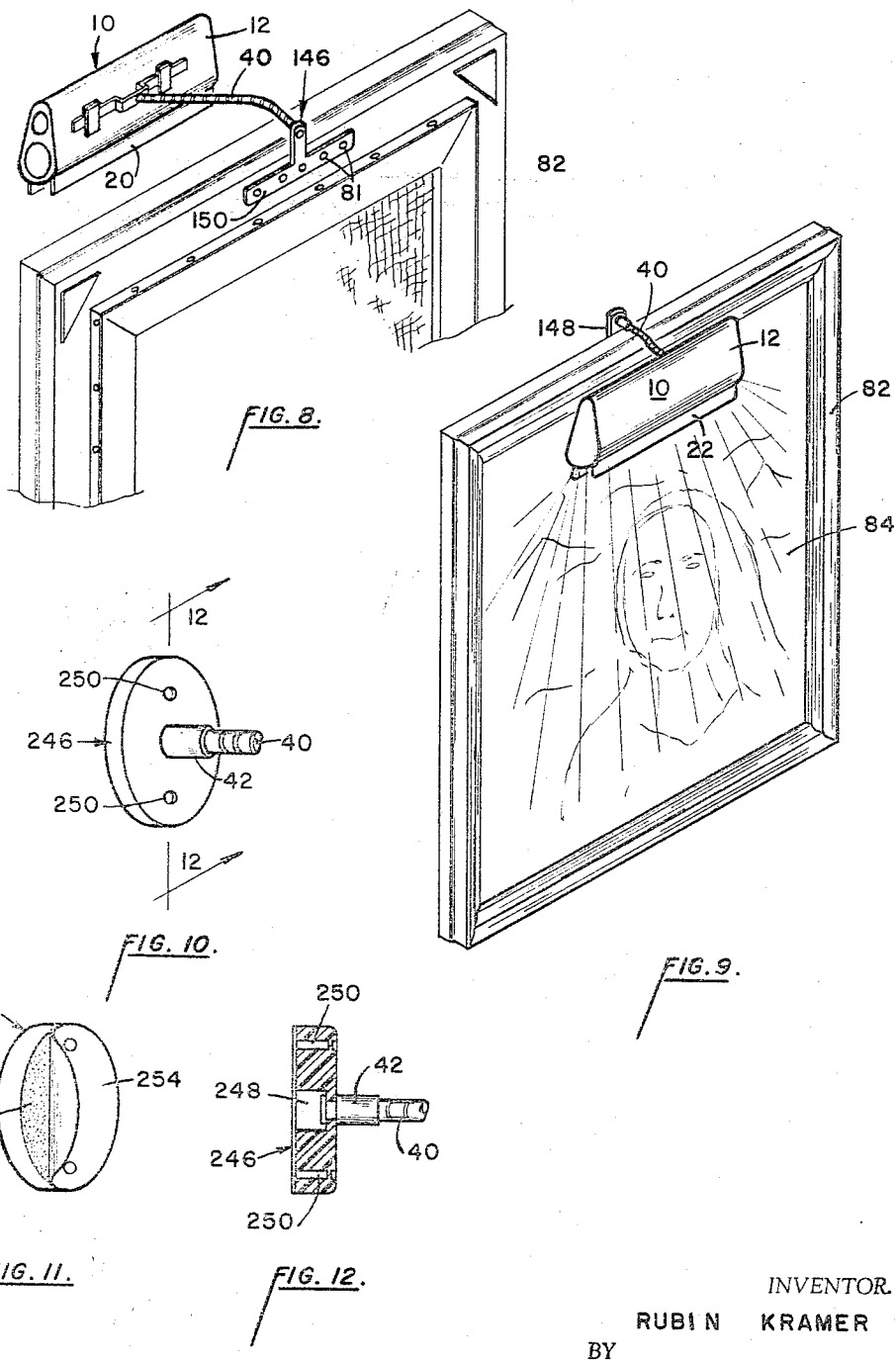

United States Patent Office 3,307,026
Patented Feb. 28, 1967

3,307,026
ARTIFICIAL ILLUMINATING DEVICE
Rubin Kramer, 11 5th Ave., New York, N.Y. 10003
Filed Mar. 3, 1964, Ser. No. 349,061
14 Claims. (Cl. 240—4)

The present invention relates, generally, to an artificial illuminating device or lamp assembly.

More particularly, this invention pertains to an artificial illuminating device or lamp assembly which is especially adapted to be mounted on and to illuminate an artistic object such as a painting or the like.

It is a primary object of the present invention to provide an artificial illuminating device which is substantially portable and which can be easily mounted directly on or adjacent to an artistic object such as a picture frame or the like without requiring the use of complex tools.

It is another primary object of this invention to provide an artificial illuminating device or lamp assembly which is lightweight, compact, simple in construction, and easily assembled or disassembled with only the use of simple tools.

A further object of the present invention is the provision of an artificial illuminating device or lamp assembly having a self-contained power source for the illumination of the lamp thereof and thus requiring no external wires or conductors which are unsightly and which limit the positioning thereof.

Still another object of this invention is to provide such a lamp assembly which is so constructed and arranged as to comprise a separate casing or enclosure for the reception of the power source in the form of replaceable or rechargeable batteries, thereby preventing possible battery leakage from contacting other components of the lamp assembly.

A still further object of the present invention is the provision of an artificial illuminating device or lamp assembly which is especially adapted to be mounted on various types and sizes of artistic objects and which is universally adjustable with respect to an artistic object upon which it is mounted.

Other objects and important features of the invention will be apparent from a study of the specification following taken with the drawings, which together show, illustrate, describe and disclose a preferred embodiment or modification of the invention and what is now considered to be the best mode of practicing the principles thereof. Other embodiments or modifications are intended to be reserved especially as they fall within the scope and spirit of the subjoined claims.

In the drawings:

FIGURE 1 is a perspective view of an artificial illuminating device or lamp assembly constructed according to the principles of the instant invention;

FIGURE 2 is a perspective view of the mounting or supporting portion of the instant lamp assembly, showing a modified form of the mounting bracket or plate;

FIGURE 3 is a perspective view of the rear portion of the housing of the instant lamp assembly;

FIGURE 4 is a side elevational view in section of the lamp assembly housing and component parts thereof, taken substantially along line 4—4 in FIGURE 5;

FIGURE 5 is an enlarged sectional view taken substantially along line 5—5 in FIGURE 1;

FIGURE 6 is a side elevational view taken substantially along line 6—6 in FIGURE 5;

FIGURE 7 illustrates the electrical circuit between the power source, lamp and actuating switch of the instant lamp assembly;

FIGURE 8 is a perspective view showing the instant lamp assembly mounted on the rear portion of a picture or painting frame;

FIGURE 9 is a perspective view showing the illumination of a painting by the instant lamp assembly when the lamp assembly is mounted on the rear portion of the frame as shown in FIGURE 8;

FIGURE 10 is a perspective view of another modified form of mounting plate for the instant lamp assembly;

FIGURE 11 is a perspective view showing the rear portion of the modified mounting plate of FIGURE 10;

FIGURE 12 is a sectional view taken substantially along line 12—12 of FIGURE 10;

FIGURE 13 is a perspective view showing a modified mounting or supporting portion for the instant lamp assembly; and FIGURE 14 is an enlarged sectional view taken substantially along line 14—14 in FIGURE 13.

Referring now to the drawings, there is illustrated in FIGURES 1 through 6 an artificial illuminating device or lamp assembly 10 comprising an elongated, generally tubular housing 12 which is transversely tapered to provide an enlarged bottom portion 14 and a reduced upper portion 16 thereof. The enlarged bottom portion 14 of the housing is provided with a longitudinal slot or opening 18 therein and a pair of flanges 20, 22 depend from the bottom portion 14 on either side of the opening 18 and serve to guide or deflect light from within the housing 12 in a manner to be described hereinafter.

As shown in FIGURES 3 and 4, the rear portion of the housing 12 has secured thereto in any suitable or conventional manner a pair of spaced, depending lugs or support members 24, each of which has an enlarged upper portion 26 in contact with the housing 12 and a lower portion 28 which is substantially parallel to and spaced from the rear wall of the housing 12. The lower portions 28 of the lugs 24 are spaced from the rear housing wall a sufficient distance to removably receive therebetween the legs 29, 30 of a supporting bracket 32 which contact the upper portions 26 of the lugs 24 to support the housing 12. The supporting bracket 32 comprises a central U-shaped portion 34 having an aperture 36 in the base thereof. Extending through the aperture 36 and rigidly secured to the U-shaped portion 34 in any suitable manner, such as press-fitting or flanging, is a first tubular section or member 38 which is adapted to receive therein one end of a flexible supporting tube or neck 40.

The flexible supporting neck 40 preferably is formed of metal and is of conventional corrugated construction, although it may be made of any other suitable material or constructed in any other suitable manner. The one end of the neck 40 is removably secured within the first tubular section 38 in any suitable manner such as press-fitting or a threaded connection, which preferably can be easily accomplished by hand. The other end of the neck 40 is removably secured in the same or a similar manner within a second tubular section 42 which is in turn rigidly secured in any suitable manner, such as press-fitting or flanging, within the aperture 44 of a mounting bracket or plate 46 (see FIGURE 1). The mounting bracket 46 is relatively small in size and is provided with apertures 48 therethrough so that it is easily mountable on a supporting structure by screws or the like.

A modified mounting bracket 146 is shown in FIGURE 2 and comprises a first leg 148 to which the second tubular section 42 is secured and a second leg 150 which is substantially perpendicular to the first leg 148 and provided with mounting apertures 152 for the reception of screws or the like.

A further modification of the mounting bracket or plate 46 is shown in FIGURES 10 through 12 wherein a generally circular mounting plate 246 is provided which is preferably formed of a substantially rigid plastic material. The modified mounting plate 246 has a central aperture 248 in which the second tubular section 42 is secured and is provided with a pair of countersunk bores 250 for the reception of mounting screws or the like. The rear face of the mounting plate 246 is provided with a coating of adhesive 252 of any suitable type, such as the water soluble or pressure sensitive type, which would provide a sufficiently strong bond with the supporting structure to support the lamp assembly 10 thereon. As seen in FIGURE 11, the adhesive layer 252 preferably is covered with a protective, easily removable cover 254 of any suitable material. It will be readily seen, therefore, that the modified mounting plate 246 may be mounted on the supporting structure for the lamp assembly 10 by screws or the like or by the adhesive layer 252.

Referring now to FIGURES 4 through 6, the housing 12 comprises a body portion 50 and end closures 52, 54 which are removably mounted on the body portion 50 in any suitable manner, such as by a press or friction fit or by a threaded connection. A casing or enclosure 56 for a power or current source such as batteries 58 is removably mounted within the upper reduced portion 16 of the housing 12 by a friction fit connection or in any other suitable manner such as a snap fit or a slidable connection. The end closure 54 is provided with a first aperture 60 disposed adjacent to and of substantially the same size as the open end of the battery casing 56 so as to receive the batteries 58 therethrough. A cap member 62 is removably receivable within the aperture 60 and is retainable therein by a friction fit, snap fit, threaded or any other suitable type of connection. The cap member 62 has a coil spring 64 mounted on the interior thereof and adapted to engage the end of the outermost battery 58 when the cap member is mounted within the end closure aperture 60. Since the batteries 58 are enclosed by the casing 56 any possible leakage from them is prevented from contacting other components of the lamp assembly 10.

A combined lamp socket and rotary switch unit 66 is mounted on the lower portion of the end closure 54 in any suitable manner. A switch actuating shaft 68 extends through an aperture in the end closure 54 and has a knob 70, preferably of a suitable plastic material, secured to the free end thereof so that the socket switch 66 may be easily actuated from without the housing 12. A lamp 72 of the incandescent or other suitable type is threadably or otherwise removably receivable within the socket and switch unit 66. Conductors 74 and 76 are provided for connecting the socket and switch unit 66 to a contact 78 at the closed end of the casing 56 adapted to engage the innermost battery 58 and a contact 80 adjacent the open end of the casing, respectively, adapted to be engaged by the cap member 62. As shown in FIGURE 7, the lamp 72, switch unit 66 and batteries 58 are connected in series so that when the switch is open the lamp cannot be energized by the batteries. It is noted that, alternatively, the socket and switch unit 66 could also include a rheostat (not shown) so that the intensity of illumination of the lamp 72 could be selectively adjusted by the knob 70.

The batteries 58 mounted in the casing 56 preferably are of the replaceable, long lasting, dry cell type, such as the nickel-cadmium type; or they may be of the rechargeable type in which case the batteries 58 could be removably mounted in the casing 56 or permanently mounted therein if the casing is provided with suitable contacts (not shown) to permit the batteries 58 to be connected to a charging apparatus. Also, a charging unit (not shown) may be mounted within the casing 56 or adjacent thereto in the housing 12 so that the entire apparatus may be plugged into an electric outlet in order to recharge the batteries 58. This integral charging unit may be of the type comprising a rectifier and a transformer so that the lamp 72 is alternatively operable by house current, if so desired, while the batteries are being recharged. In the latter case, the rectifier and transformer both could be mounted within the charging unit or the transformer could be carried by the connector plug to reduce the weight of the charging unit.

As shown in FIGURES 8 and 9, the instant illuminating device or lamp assembly 10 is especially adapted to be directly mounted on or adjacent to artistic objects such as paintings or the like. The mounting bracket 146 has the second leg 150 thereof secured by screws 81 or the like to the rear portion of the frame 82 for the painting 84 so that the first leg 148 thereof extends upwardly above the frame 82 a sufficient distance to enable the flexible neck 40, connected to the first leg 148, to extend over the frame 86. The other end of the neck 40, therefore, supports the lamp housing 12 adjacent to the upper portion of the painting and illumination from the lamp 72 passes through the opening or slot 18 in the bottom housing portion 14 and is directed onto the painting 84 by the depending housing flanges 20, 22 to sufficiently illuminate the painting. It is noted that since the housing neck 40 is substantially universally adjustable, the position of the housing 12 may be conveniently changed to illuminate various types and shapes of paintings or other artistic objects. While the instant lamp assembly 10 has been specifically disclosed in combination with a painting and frame therefor, it is to be understood that it may be used to illuminate any suitable type of object, whether artistic or not.

A modified mounting construction for the instant lamp assembly 10 when it is mounted on a frame 82 for a painting 84 is illustrated in FIGURES 13 and 14. In this modified mounting construction, the second tubular section 42, instead of being connected at its end to a supporting bracket or plate 46, 146 or 246, has its bottom portion rigidly secured in any suitable manner to a plate 86 which is adapted to rest on the upper portion of the frame 82. The plate 86 is provided with a first downwardly curved end portion 88 which is adapted to engage around the front corner of the frame 82, and a second downwardly curved portion 90 at the other end thereof which is adapted to engage the wall 92 or other supporting structure for the frame 82 in a manner to avoid scratching or other damage thereto. The plate 86 is provided with an aperture adjacent the curved portion 90 through which the upper threaded portion 94 of a mounting bolt 96 extends. The lower end of the bolt 96 is provided with an outwardly flaring hook 98 which is adapted to engage under the upper frame member 100 for the painting or canvas 84, and a wing nut 102 is threadably received on the threaded bolt portion 94 to removably maintain the bolt hook 98 and plate 86 in tight engagement with the frame member 100 and frame 82, respectively. The threaded portion 94 of the bolt 96 is provided with a plurality of spaced weakened portions 104 (see FIGURE 14) so that the length of the bolt 96 can be conveniently reduced for pictures and frames of varying size.

It will be readily seen that the present invention provides a portable lamp assembly 10 which is compact, simple in construction, easily assembled or disassembled, and easily mounted on artistic or other type objects for the illumination thereof. Also, since the instant lamp assembly 10 has a self-contained power source in the form of replaceable or rechargeable batteries 58, it does not require external wires or conductors which are unsightly when hanging from an artistic object or the like.

While the invention has been shown, illustrated, described and disclosed in terms of an embodiment or modification which it has assumed in practice, the scope of the invention should not be deemed to be limited by the precise embodiment or modifications herein shown, illustrated, described or disclosed, such other embodiments or modifications intended to be reserved especially as they fall within the scope of the claims here appended.
What is claimed is:
1. A lamp assembly comprising:
an elongated housing having a generally tubular body portion and an end closure removably mounted on each end of said body portion,
a generally tubular casing mounted within said body portion adjacent the upper portion thereof, said casing having an open end adjacent one of said end closures,
an electric current source mounted within said casing,
said one end closure having a first opening adjacent to and of substantially the same size as said casing opening,
a cap member removably mounted within said end closure first opening and having a coil spring attached to the interior thereof and in contact with said current source,
a socket and switch unit disposed within said housing body portion adjacent the bottom portion thereof and secured to said one end closure.
said one end closure having a second opening adjacent said socket and switch unit,
a switch actuating rod operatively connected to said switch unit and extending outwardly through said one end closure second opening,
a gripping knob mounted on the outer end of said switch actuating rod,
a lamp removably mounted within said socket and switch unit,
said lamp, said switch unit and said current source being electrically connected in series,
said housing body portion having a longitudinal opening in the bottom portion thereof and a depending flange on either side of said longitudinal opening for guiding illumination from said lamp passing through said longitudinal opening,
a pair of lugs secured to the outer surface of one side of said housing body portion, said lugs being spaced from each other and having the lower portions thereof disposed in spaced relation to said outer surface of said one body portion side,
a supporting bracket having a pair of legs which are removably receivable between said one body portion side and said lower lug portions for supporting said housing,
a first tubular section secured to said supporting bracket,
a flexible neck member having one end thereof removably mounted within said first tubular section,
a mounting plate disposed adjacent the other end of said flexible neck member, and
a second tubular section secured to said mounting plate and having said other end of said flexible neck member removably mounted therein.

2. The lamp assembly as recited in claim 1 wherein said mounting plate comprises an elongated member having said second tubular section mounted thereon adjacent one end thereof and having a plurality of screw-receiving apertures adjacent the other end thereof.

3. The lamp assembly as recited in claim 1 wherein said mounting plate comprises a first leg having said second tubular section secured thereto, and a second leg disposed in perpendicular relation to said first leg and having a plurality of screw-receiving apertures therein.

4. The lamp assembly as recited in claim 1 wherein said mounting plate comprises a generally circular member having said second tubular section secured to the central portion thereof and extending from one side thereof, a plurality of screw-receiving apertures therethrough, a layer of adhesive on the other side thereof, and a removable protective cover over said adhesive layer.

5. The lamp assembly as recited in claim 1 wherein said mounting plate comprises a first curved portion adjacent one end thereof adapted to engage a supporting structure for the lamp assembly, a second curved portion adjacent the other end thereof, and an aperture therethrough adjacent said second curved portion,
a mounting bolt extends through said plate aperture, said mounting bolt having a threaded portion at the end thereof adjacent said plate and a hook portion at the opposite end thereof adapted to engage the supporting structure, and
a wing nut is threadably secured on said threaded portion of said bolt to maintain said bolt and said plate in a predetermined relation.

6. The lamp assembly as recited in claim 1 wherein said electric current source comprises a battery of the replaceable type.

7. The lamp assembly as recited in claim 1 wherein said electric current source comprises a storage battery of the rechargeable type.

8. The lamp assembly as recited in claim 7 wherein a charging unit for said storage battery is mounted within said lamp assembly housing.

9. A lamp assembly comprising:
a generally tubular housing,
a casing mounted within said housing and having an open end adjacent one end thereof,
an electric current source mounted within said casing,
a socket and switch unit mounted within said housing and having a switch actuating member disposed outside said housing,
a lamp removably mounted within said socket and switch unit and being connected to said electric current source,
said housing having a longitudinal opening in the portion thereof adjacent said lamp for permitting illumination from said lamp to be received outwardly of said housing,
a support member secured to the outer surface of one side of said housing,
a supporting bracket adapted to engage said support member for supporting said housing,
a flexible neck member having one end thereof removably secured to said supporting bracket, and
a mounting plate disposed adjacent the other end of said flexible neck member and removably secured thereto, said mounting plate being adapted to be secured to a support structure for said lamp assembly.

10. Apparatus for mounting a lamp assembly on a frame for a decorative or artistic object, comprising:
a supporting bracket adapted to be removably structurally associated with said housing for supporting the same, a flexible neck member having one end thereof connected with said supporting bracket, and a mounting plate removably connected to the other end of said flexible neck member and being adapted to be removably secured to said frame, enabling said housing to easily be associated with and dis-assembled from said neck member to permit periodic maintenance to be performed on said lamp assembly, wherein said housing is provided with support lugs secured thereto, and wherein
said supporting bracket comprises a pair of legs engageable with said support lugs, and a generally central U-shaped portion extending outwardly from said housing and having said one end of said neck member removably connected thereto.

11. The apparatus as recited in claim 10 wherein a first tubular section is secured to said U-shaped portion of said supporting bracket, and
said one end of said neck member is removably mounted within said first tubular section.

12. Apparatus for mounting a lamp assembly housing on a frame for a decorative or artistic object, comprising:
a support bracket adapted to be removably structurally associated with said housing for supporting the same,
a flexible neck member having one end thereof connected with said supporting bracket, and a mounting plate removably connected to the other end of said flexible neck member and being adapted to be removably secured to said frame, enabling said housing to easily be associated with and disassembled from said neck member to permit periodic maintenance to be performed on said lamp assembly, a second tubular section being secured to said mounting plate, and said other end of said neck member being removably mounted within said second tubular section, wherein said mounting plate comprises a first curved portion adjacent one end thereof adapted to engage the front portion of said frame, a second curved portion adjacent the other end thereof adapted to engage a supporting structure for said frame, and an aperture therethrough adjacent said second curved portion, and wherein a mounting bolt extends through said plate aperture, said mounting bolt comprising an upper threaded portion extending through said plate aperture and a lower hooked portion adapted to engage a rear portion of said frame, and a nut threadably received on said upper threaded portion for maintaining said bolt and said mounting plate in a predetermined relation.

13. The apparatus as recited in claim 12 wherein said threaded portion of said bolt is provided with a plurality of spaced weakened portions, enabling the length of said bolt to be conveniently shortened.

14. In combination with a lamp assembly comprising a source of illumination and an electric current source mounted within a housing, a mounting bracket for enabling said lamp assembly to be supported relative to an object, said mounting bracket comprising:
  support structure structurally associated with said housing and adapted to be engaged with said object, and
  a mounting bolt for clamping said support structure in such engagement with said object,
said mounting bolt comprising:
  a hooked portion adjacent one end of said bolt adapted to engage said object, and
  a threaded portion adjacent the other end of said bolt adapted to be secured to a supporting structure,
  said threaded portion of said bolt being provided with a plurality of spaced weakened portions to enable the length of said bolt to be selectively and conveniently reduced.

References Cited by the Examiner
UNITED STATES PATENTS

| | | | |
|---|---|---|---|
| 711,622 | 10/1902 | Fergusson | 240—4 |
| 922,222 | 5/1909 | Weatherly | 88—1 |
| 1,279,803 | 9/1918 | Watson | 240—52 |
| 1,409,524 | 3/1922 | Chase | 85—1 |
| 2,289,471 | 7/1942 | Welter et al. | 240—2 |
| 2,376,279 | 5/1945 | Schlenkert | 85—1 |
| 2,534,945 | 12/1950 | Booth | 240—6.45 |
| 2,691,721 | 10/1954 | Bornhuetter | 240—73 |
| 2,777,941 | 10/1957 | Cookerly et al. | 240—73 X |
| 2,945,946 | 7/1960 | Moffatt | 240—52.1 X |

NORTON ANSHER, *Primary Examiner.*

C. C. LOGAN II, *Assistant Examiner.*